United States Patent
Raghunathan et al.

(10) Patent No.: US 10,482,096 B2
(45) Date of Patent: Nov. 19, 2019

(54) DISTRIBUTED INDEX SEARCHING IN COMPUTING SYSTEMS

(71) Applicant: Microsoft Technology Licensing, LLC, Redmond, WA (US)

(72) Inventors: Nandakumar Raghunathan, Redmond, WA (US); Lokesh Bhoobalan, Bellevue, WA (US); Ashwath Narayan Raghunathan, Redmond, WA (US); Thottam Sriram, Redmond, WA (US); Deiva Shankar UthayaSankaralingam, Redmond, WA (US); Robin Thomas, Kirkland, WA (US); Tariq Sharif, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 15/430,708

(22) Filed: Feb. 13, 2017

(65) Prior Publication Data
US 2018/0232424 A1    Aug. 16, 2018

(51) Int. Cl.
| G06F 16/24 | (2019.01) |
| G06F 16/248 | (2019.01) |
| G06F 16/27 | (2019.01) |
| G06F 16/2458 | (2019.01) |

(52) U.S. Cl.
CPC ........ *G06F 16/248* (2019.01); *G06F 16/2471* (2019.01); *G06F 16/27* (2019.01)

(58) Field of Classification Search
CPC ..... G06F 16/248; G06F 16/2471; G06F 16/27
See application file for complete search history.

(56) References Cited

U.S. PATENT DOCUMENTS

| 5,960,194 A | 9/1999 | Choy et al. |
| 7,254,580 B1 * | 8/2007 | Gharachorloo ..... G06F 16/2471 |
| 7,372,976 B2 | 5/2008 | Rhoads et al. |
| 7,818,170 B2 | 10/2010 | Cheng |
| 8,046,367 B2 | 10/2011 | Saunders |
| 8,843,507 B2 | 9/2014 | Xiao et al. |
| 8,938,459 B2 | 1/2015 | Garbe |
| 8,977,623 B2 | 3/2015 | Yang |
| 9,183,240 B2 | 11/2015 | Gokhale |

(Continued)

OTHER PUBLICATIONS

"Distributed indexing", http://nlp.stanford.edu/IR-book/html/htmledition/distributed-indexing-1.html, Published on: Apr. 7, 2009, 3 pages.

(Continued)

*Primary Examiner* — Loc Tran
(74) *Attorney, Agent, or Firm* — Liang IP, PLLC

(57) ABSTRACT

Computer systems, devices, and associated methods of providing distributed index searching are disclosed herein. In one embodiment, a method includes receiving, at a database server, search terms included in a search query for content from a member and in response to receiving the search terms, determining a subset of the distributed indices to be searched in response to the search query based on the received search terms and one or more records of searching features on the database server. The method also includes providing the determined list of distributed indices to be searched based on the search terms in the search query.

18 Claims, 8 Drawing Sheets

(56) References Cited

U.S. PATENT DOCUMENTS

| | | | |
|---|---|---|---|
| 2001/0049693 A1* | 12/2001 | Pratt | G06F 16/2219 |
| 2004/0002901 A1* | 1/2004 | Baker | G06Q 10/087 |
| | | | 705/21 |
| 2006/0041560 A1* | 2/2006 | Forman | G06F 16/951 |
| 2008/0033934 A1 | 2/2008 | Richards et al. | |
| 2012/0259831 A1 | 10/2012 | Wang et al. | |
| 2017/0220566 A1* | 8/2017 | Byron | G06F 16/93 |

OTHER PUBLICATIONS

"International Search Report and Written Opinion Issued in PCT Application No. PCT/US18/017137", dated Apr. 19, 2018, 11 Pages.

* cited by examiner

DISTRIBUTED INDEX SEARCHING IN COMPUTING SYSTEMS

BACKGROUND

Corporations, schools, charities, government entities, and other types of organizations often deploy private computer networks commonly referred to as intranets. Such intranets can include servers, network devices, or other suitable devices under the control of an organization, or can include a web-based solution such as SharePoint®, Google Drive®, or computing platforms. Intranets can allow members of an organization to securely share information within the enterprise. For example, an intranet can be configured to store, track, or otherwise manage internal documents of an organization. In contrast, the term "internet" typically refers to public computer networks interconnecting individuals and organizations. One such example is the Internet, which contains billions interconnected of computers worldwide based on the TCP/IP protocol.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Intranets can provide members of an organization ability to search for various types of content items within the organization. For example, an intranet can include one or more repositories that store emails, documents, videos, audios, webpages, or other suitable types of content. The intranet can also include a search engine that allows members of the organization to search and retrieve any stored content. Such searches can be based on, for example, keywords, alternate phrases, or other suitable criteria. The search engine can then return a list of content items to the members as search results.

One challenge of facilitating searching and retrieval of content is the efforts involved in compiling and maintaining an index for the various content items on the intranets. For example, certain intranets can include thousands of content servers containing different content items. To compile and update a master index that reference all content items across such many content servers can involve a large amount of efforts and costs due to accuracy, latency, and other requirements. For example, changes in content items may require speedy update in the master index to ensure accurate indexing of the content items. Compiling such master indices is also not readily scalable because each content item corresponds to an entry in the master index. In addition, servers or other suitable components supporting the master index can be a single point of failure for the entire searching and retrieval system.

One technique for addressing the foregoing challenges is to partition the master index into multiple distributed child indices (or "shards"). Instead of referencing a content item directly, the master index instead references one of the child indices that in turn directly references the content item. During a search, the master index can identify a shard that may contain the searched content item(s) and delegate searching and retrieval of the content item(s) to the shard(s) in a technique commonly referred to as "fan out". Such a technique, however, still involve great efforts in compiling, updating, and maintaining the references between the master index and the child indices. For example, once a reference between a child index and a content item is established, changed, or removed, the master index must be immediately updated accordingly in order to ensure that any provided search data is accurate and "fresh."

Several embodiments of the disclosed technology can address at least some of the foregoing challenges by providing (i) servers hosting distributed indices (or shards) close to corresponding content items and (ii) a database server hosting a database containing records of searching features of the content items related to an organization, sub-organizations, groups of members, or individual members of the organization. For example, such searching features can include top keywords, query history, amount of searching or other activities in the organization, sub-organizations, groups of members, and/or a member of the organization. Data of such searching features can be collected periodically from the individual servers hosting the distributed indices using a crawler or other suitable components and/or techniques.

In certain embodiments, a search request for content can be received from a member of the organization at a search engine containing records of searching history and/or other suitable types of profile information regarding the member. The search engine can then transmit the search request with corresponding search terms (e.g., "engineering doc") and the member's profile information to the database server containing the records of searching features. The database server can then determine a subset of distributed indices to be searched based on the records of the searching features, the profile information of the member, and/or the search terms included in the search request. In one example, the database server can determine that the subset of distributed indices to be searched only include indices related to the sub-organization (e.g., "engineering department") of the member. In other examples, the database server can determine that the subset of distributed indices can include those most searched in the organization, a sub-organization of the organization, or a group of other members the member interacts most with. In other embodiments, the search engine can also supplement, subtract, or otherwise modify the subset of distributed indices based on, for instance, the search history of the member or other suitable information.

The database server can then provide the determined subset of distributed indices to the search engine. In response, the search engine can "fan out," e.g., by requesting corresponding content servers hosting the subset of distributed indices to conduct content item searches based on the received searching request. The content servers can then perform the requested search based on keyword, alternate expression, or other suitable searching techniques. The content servers can then provide derived search results back to the search engine. The search engine can then compile, organize, or otherwise process the received search results, and provide a list of content items to the member in response to the search request.

Several embodiments of the disclosed technology can eliminate the large amount of efforts involved in maintaining a master index of all content items on an intranet of an organization. Unlike massive master indices (e.g., gigabytes) that each include records of millions of content items or sub-indices, the database size of searching feature records can be quite small (e.g., kilobytes). The searching features do not aim to capture all references of content items available. Instead, the searching features aim to capture statistical or profile information related to how such content items referenced in a distributed index have been searched. Several embodiments of the disclosed technology can thus be scalable. Unlike techniques implementing master indices, modifications of references in a distributed index may not necessarily increase the database size of the searching features because searching activities of the modified references may be combined with existing searching features. Thus, each distributed index can independently create, update, or manage references to corresponding content items without requiring immediate update in the database of the searching features.

DETAILED DESCRIPTION

Figure 1:
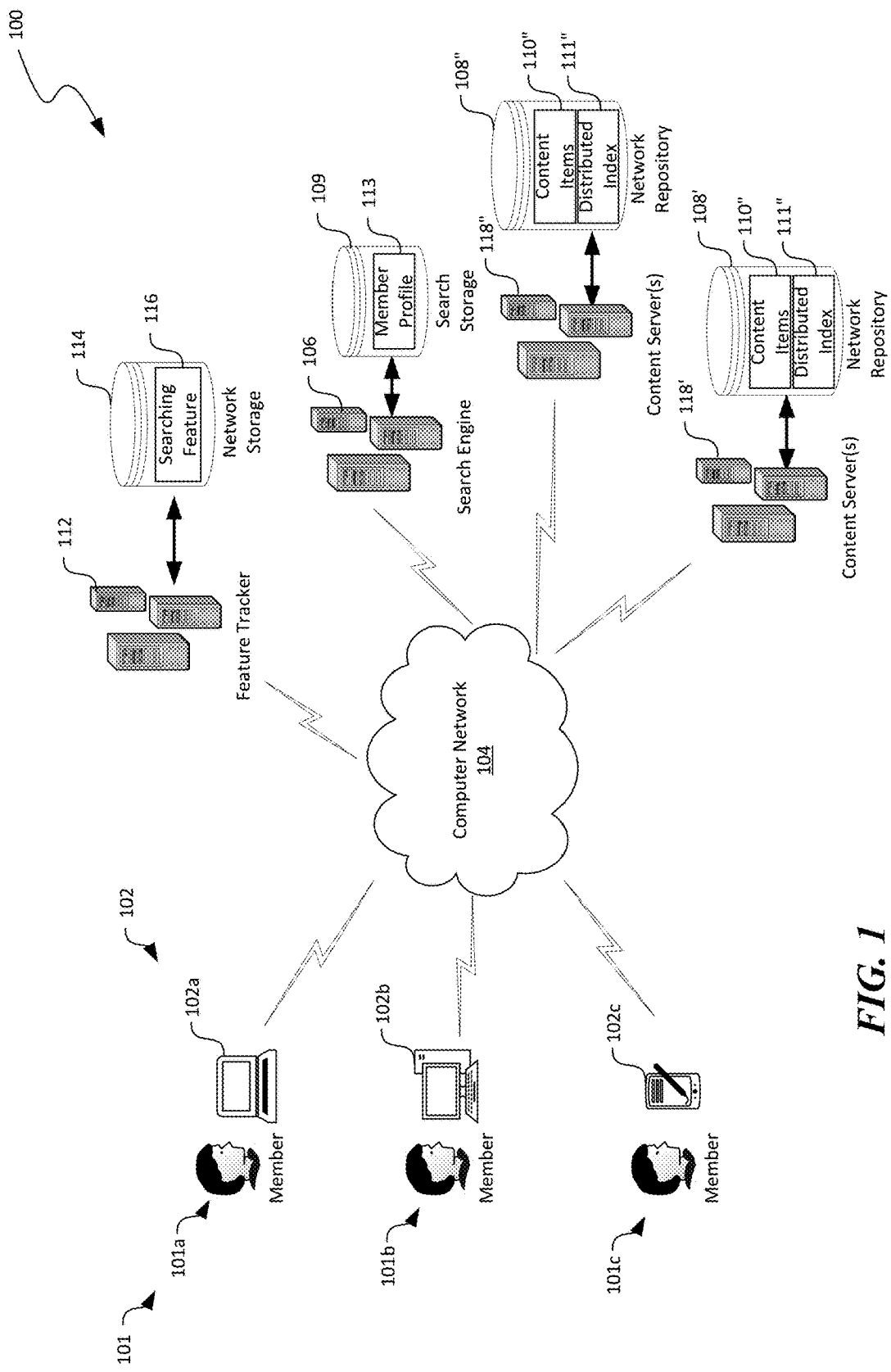
FIG. 1 is a schematic diagram illustrating a computing system implementing distributed index searching of content in accordance with embodiments of the disclosed technology.

Certain embodiments of systems, devices, components, modules, routines, data structures, and processes for distributed index searching in a computer network are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "content item" generally refers to an item of information resource accessible via a computer network. For example, a content item can include a document containing text, images, sounds, videos, or animations stored in a network repository and accessible via the computer network. In another example, a content item can also include a website with one or more webpages accessible via the computer network. In additional examples, content items can include blog sites, discussion forums, electronic commerce sites, or other suitable types of resources.

Also used herein, the term "distributed index" or "shard" generally refers to a partition of records in a database or search engine. Each distributed index or shard can be hosted and maintained on a separate content server. The individual shards can be implemented as horizontal, vertical, or other suitable partition of an overall index. In certain embodiments, one or more database records may be present in more than one distributed indices. In other embodiments, a database record may only appear in a single distributed index.

As used herein, the term "searching features" generally refers to metadata, database records, or other suitable types of data containing information of content searching or interaction profiles related to an intranet, internet, or other suitable types of computing systems. In one example, the profiles can be compiled as database records based on searching histories of an organization, a sub-organization, a group of members, or individual members of the organization. For instance, a profile record can contain top keywords searched, query history, amount of searching of an organization, sub-organization, groups of members, or individual members of the organization on an intranet. In another example, the profiles can also include database records compiled based on interaction history of sub-organization, groups of members, or individual members of an organization. For instance, another profile record can contain emails sent, comments received, or other suitable types of interactions between members over an intranet. Examples database records suitable for storing searching features are described in more detail below with reference to FIGS. 4A-4B.

Intranets can provide members of an organization an ability to search for various types of content items within the organization. However, efforts involved in compiling, updating, and maintaining a distributed index of the content items can quickly escalate to unsustainable levels. For example, to compile and update a master index that reference thousands or even millions content items can involve a large amount of efforts and costs due to accuracy, latency, and other requirements. Several embodiments of the disclosed technology can address at least some of the foregoing challenge by maintaining a database containing records of searching features related to an organization, sub-organizations, groups of members, or individual members of the organization, instead of a master index that references all content items or child indices hosted on content servers. During a search, a subset of content servers can be identified based on a search request and the searching features in the database. The search request can then be fanned out to the subset of content servers to search distributed indices and retrieve suitable content items, as described in more detail below with reference to FIGS. 1-7.

FIG. 1 is a schematic diagram illustrating a computing system 100 implementing personalized content suggestion in accordance with embodiments of the disclosed technology. As shown in FIG. 1, the computing system 100 can include a computer network 104 interconnecting client devices 102, a search engine 106, a feature tracker 112, and one or more content servers 118. In the illustrated embodiment, two content servers 118 are shown for illustration purposes. In other embodiments, the computing system 100 can include three, four, or any suitable number of content servers 118. The computer network 104 can include an organization intranet, a social network, the Internet, or other suitable types of network.

The computing system 100 can also include a network repository 108 operatively coupled to the content servers 118 and a network storage 114 operatively coupled to the feature tracker 112. As shown in FIG. 1, the network repository 108 can be configured to store records of content items 110 and corresponding distributed index 111 accessible via the computer network 104. The network storage 114 can be configured to store records of searching features 116 containing data representing searching profiles and interaction among the members 101 over the computer network 104.

In the illustrated embodiment, computing system 100 can further include a search storage 109 operatively coupled to the search engine 106. The search storage 109 can be configured to store records of member profile 113. In certain examples, the member profile 113 can include email address, organization hierarchy, interactions with other members 101, and content visit histories of a member 101. In other examples, the member profile 113 can also include sub-organization(s) the member 101 belongs to, content browsing histories, or other suitable profile information related to a member 101. In other embodiments, the records of member profile 113 can be stored in the network storage 114 or one or more of the network repositories 108.

Even though particular components and associated arrangements of the computing system 100 are shown in FIG. 1, in other embodiments, the computing system 100 can include additional and/or different components. For example, in certain embodiments, the network repository 108 and the network storage 114 can be combined into a single physical or logical storage space. In other embodiments, the computing system 100 can also include caching servers, load balancers, or other suitable components.

The client devices 102 can individually include a computing device that facilitates access to the network repository 108 via the computer network 104 by members 101 (identified as first, second, and third members 101*a*-101*c*). For example, in the illustrative embodiment, the first client device 102*a* includes a laptop computer. The second client device 102*b* includes a desktop computer. The third client device 102*c* includes a tablet computer. In other embodiments, the client devices 102 can also include smartphones or other suitable computing devices. Even though three members 101 are shown in FIG. 1 for illustration purposes, in other embodiments, the computing system 100 can facilitate any suitable number of members 101 access to the network repository 108 via the computer network 104.

In certain embodiments, the search engine 106, the feature tracker 112, and the content servers 118 can each include one or more interconnected computer servers, as shown in FIG. 1. In other embodiments, the foregoing components of the computing system 100 can each include a cloud-based service hosted on one or more remote computing facilities such as datacenters. In further embodiments, certain components (e.g., the content servers 118) may be omitted from the computing system 100 and be provided by external computing systems (not shown).

The content servers 118 can be configured to provide one or more content items 110 accessible by the members 101 via the computer network 104. For example, in one embodiment, the content servers 118 can be configured to provide an organization file management system that allows the members 101 to securely create, modify, delete, or otherwise process content items 110. In other embodiments, the content servers 118 can also be configured to provide a social network website with webpages that allow the members 101 to post content items 110, comment on one another's content items 110, share and/or recommend content items 110 with additional members 101, or perform other suitable actions.

The content servers 118 can also be configured to independently receive, store, catalog, or otherwise manage the content items 110 in the corresponding network repository 108. As shown in FIG. 1, the content servers 118 can individually compile, update, or maintain a distributed index 111 of the content items 110 stored on or co-located with the content items 110 the corresponding content servers 118. The distributed indices 111 can include keywords, related words, or other suitable references that facilitate locating a particular content item 110. For example, the first content server 118' can independently compile, update, and maintain a first distributed index 111' for searching the first set of content items 110' stored on the first network repository 108' operatively coupled to the first content server 118'. The second content server 118' can also independently compile, update, and maintain a second distributed index 111" for searching the second set of content items 110" stored on the second network repository 108" operatively coupled to the second content server 118". As such, the first distributed index 118' can include entries different than the second distributed index 118". The content servers 118 can also be configured to search the corresponding distributed indices 111 based on search terms or other suitable information, as described in more below.

The feature tracker 112 can be configured to generate, update, or otherwise manage records of searching features (i) for an organization utilizing the computer system 100 and (ii) among the individual members 101 and one or more content items 110 stored in the network repositories 108. For example, in one embodiment, the feature tracker 112 can record interactions between pairs of the members 101 via online postings, emails, phone calls, text messages, online chats, or other suitable interactions. In another embodiment, the feature tracker 112 can also record interactions between the individual members 101 and one or more of the content items 110. Example interactions can include creating, editing, saving, viewing, commenting, or performing other suitable actions by the members 101 on the content items 110.

In further embodiments, the feature tracker 112 can also be configured to record organizational positions, expertise, or other suitable information related to the individual members 101. In yet further embodiments, the feature tracker 112 can collect searching histories of an organization, sub-organization, groups of members 101, or the individual members 101 from the content servers 108 using a crawler or other suitable techniques. In yet other embodiments, the feature tracker 112 can be configured to identify a list of content servers 118 to be searched based on the records of the searching features 116, as described below. Certain hardware/software components suitable for the features tracker 112 are described below with reference to FIGS. 2A-3.

The search engine 106 can be configured to provide a list of content items 110 in the network repositories 108 to the member 101 in response to a search query 138 received from the member 101. In certain embodiments, the search engine 106 can be configured to receive a search query 138 from the member 101. The search query 138 can contain one or more search terms (e.g., "engineering doc"). In response, in certain embodiments, the search engine 106 can be configured to transmit the received search query 138 and information in a record of member profile 113 corresponding to the member 101 to the feature tracker 112.

In turn, the feature tracker 112 can identify a list of content servers 118 and/or distributed indices 111 maintained on the content servers 118 to be searched based on the searching features 116 stored in the network storage 114. The feature tracker 112 can then transmit the identified list of content servers and/or distributed indices 111 to the search engine 106, which in turn transmits one or more search requests to the identified content server(s) 118 for searching corresponding distributed indices 111 based on the search terms in the search query 138. The content server(s) 118 can then performed the requested searches and return a set of search results to the search engine 106 to be presented to the member 101. In certain embodiments, the feature tracker 112 and the search engine 106 can each include a standalone server or cluster of servers in the computing system 100. In other embodiments, the feature tracker 112 and/or the search engine 106 can also be a computing service deployed in the computing system 100 on, for example, one or more of the content server(s) 118 or other suitable components. Various embodiments of components and operations of the search engine 106, feature tracker 112, and content servers 118 are discussed in more details below with reference to FIGS. 2A-2C.

Figure 2A:
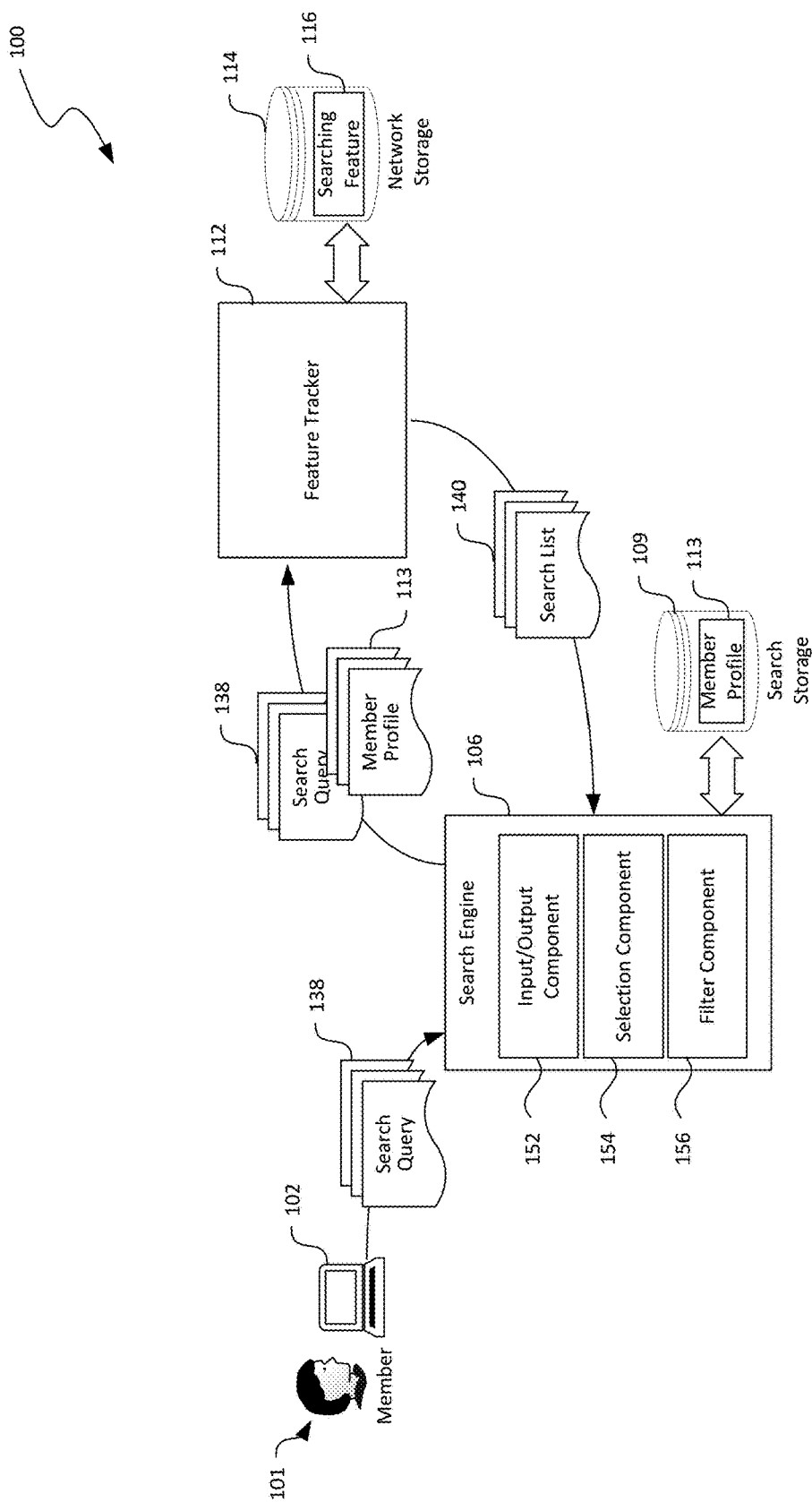
FIGS. 2A-2C are schematic diagrams illustrating hardware/software components of the computing system of FIG. 1 during a content search operations in accordance with embodiments of the disclosed technology.
Figure 2B:
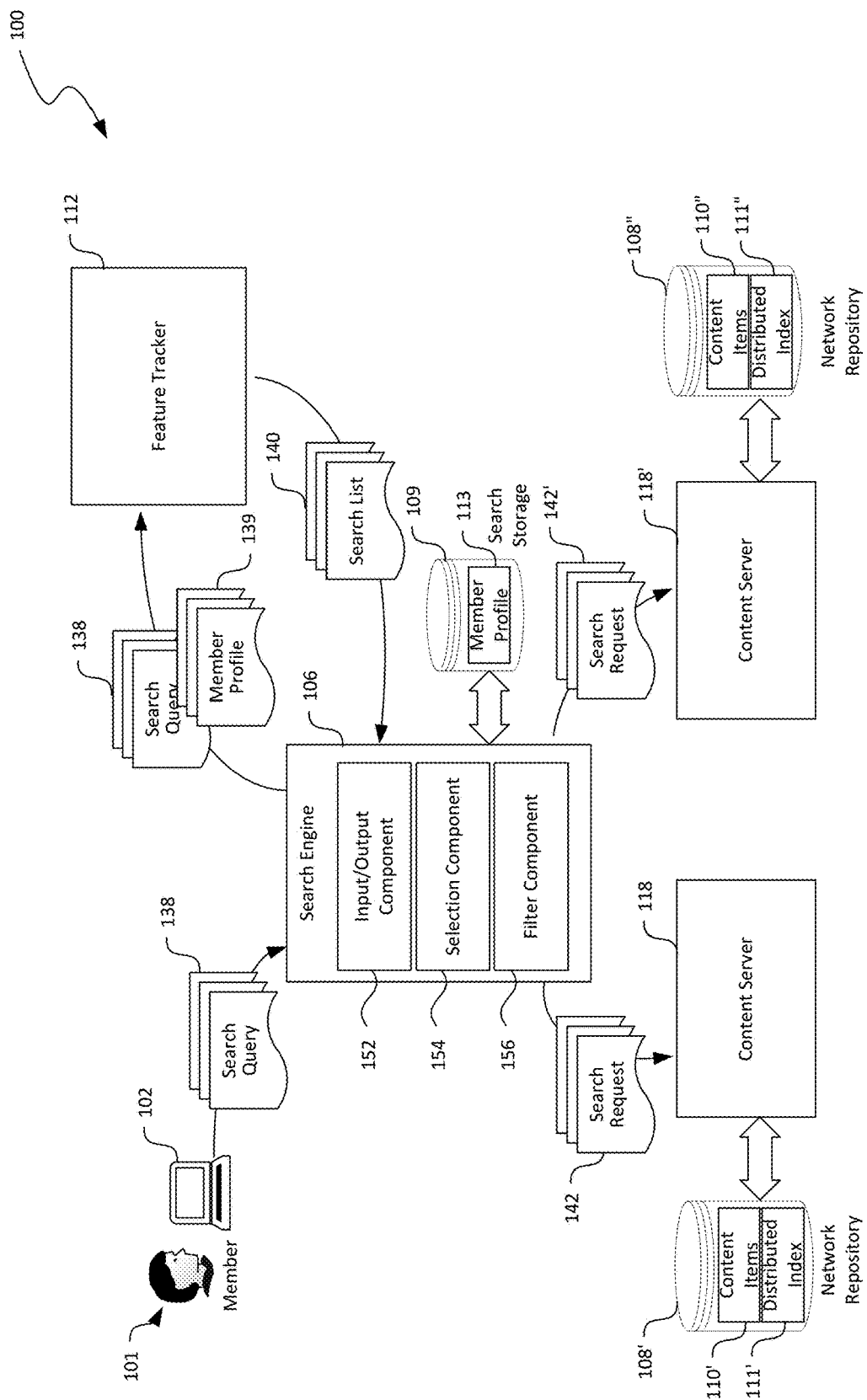
Figure 2C:
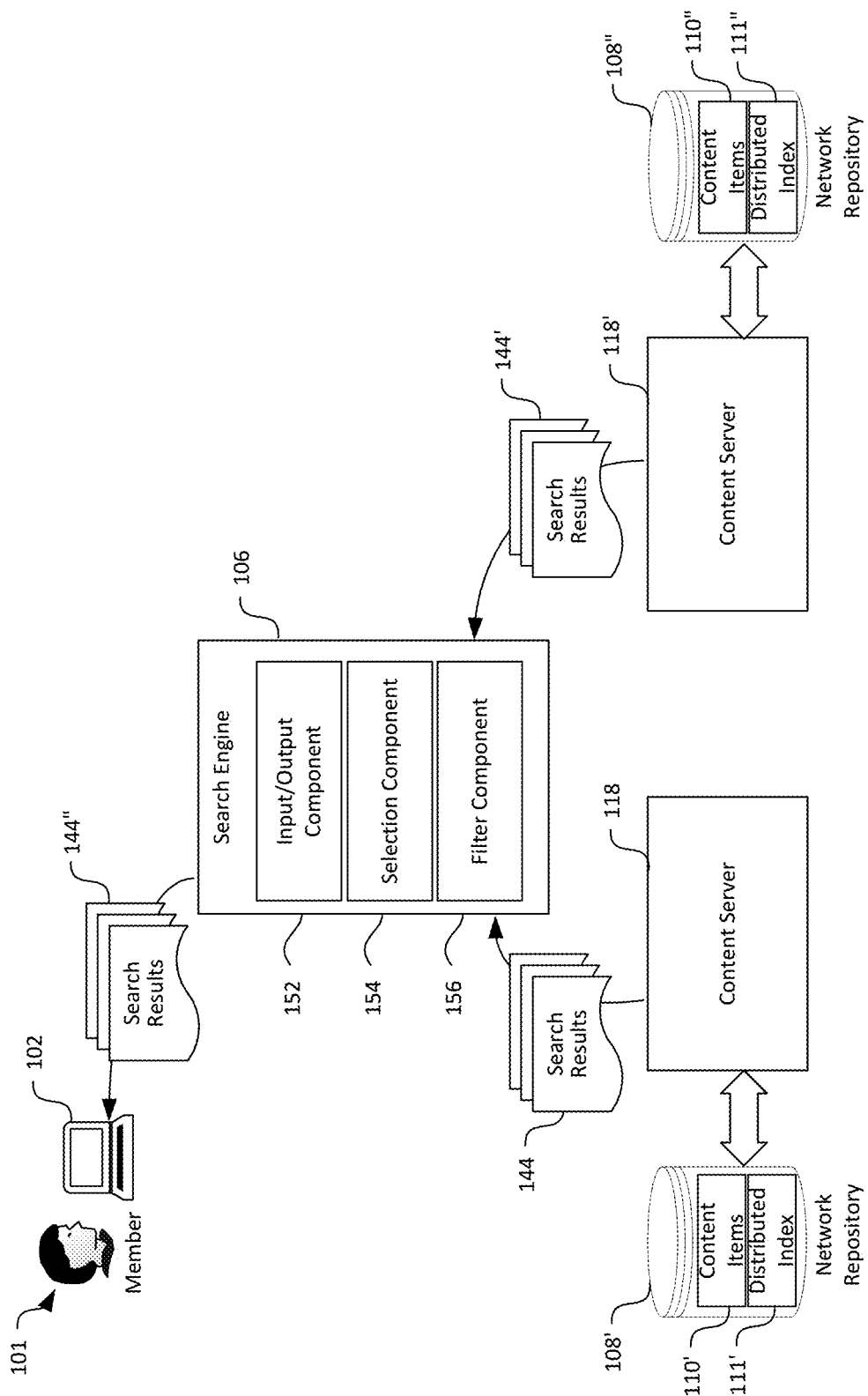

FIGS. 2A-2C are schematic diagrams illustrating hardware/software components of the search engine 106, feature tracker 112, and content servers 118 of FIG. 1 during a search in accordance with embodiments of the disclosed technology. In the following description, certain components of the computing system 100 are omitted from certain figures for clarity. For example, the content servers 110 are omitted in FIG. 2A, and the feature tracker 112 is omitted from FIG. 2C.

In addition, in FIGS. 2A-2C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the search engine 106 can include an input/output component 152, a selection component 154, and a filter component 156 operatively coupled to one another. Even though particular components of the search engine 106 are shown in FIG. 2A and other figures herein, in other embodiments, the search engine 106 can also include caching component, sorting component, database component, or other suitable components. In further embodiments, the filter component 156 and/or other components may be omitted from the search engine 106.

The input/output component 152 can be configured to receive a search query 138 from a member 101 via a client device 102. In one embodiment, the search query 138 can include an input in a search box displayed on a webpage, for example, provided by one of the content servers 118 of FIG. 1. In another embodiment, the search query 138 can include an input in an address field of a browser, an express command from the member 101, or other suitable types of user input from the member 101. The input/output component 152 can be configured to provide the received search query 138 to the selection component 154 for further processing. In certain embodiments, the input/output component 152 can include a user interface on, for example, a web browser. In other embodiments, the input/output component 152 can include an application programming interface or other suitable types of interface.

The selection component 154 can be configured to determine a list of content servers 118 (FIG. 1) and/or corresponding distributed indices 118 to search for content items based on the received search query 138. In certain embodiments, the selection component 152 can retrieve a record of member profile 113 from the search storage 109 corresponding to the member 101. The selection component 154 can then transmit at least a portion of the search query 138 and the member profile 113 to the feature tracker 112. Upon receiving the search query 138 and the member profile 113, the feature tracker 112 can be configured to determine a search list 140 containing identifications of content servers 110 and/or corresponding distributed indices 118 based on the searching features 116 stored in the network storage 116, as described in more detail below with reference to FIG. 3. The feature tracker 112 can then return the determined search list 140 to the search engine 106.

As shown in FIG. 2B, in certain embodiments, the selection component 154 can transmit one or more search requests 142 to the content servers 118 identified in the received search list 140 via the computer network 104 (FIG. 1). In certain examples, the search requests 142 can contain data representing the search terms in the search query 138 and an instruction to search the distributed indices 111 for content items 110 based on the search terms. In other examples, the search requests 142 can also contain a target size of search results, latency requirements, and/or other suitable information.

In other embodiments, the selection component 154 can modify the search list 140 before transmitting the search requests 142. For instance, the selection component 154 can supplement the search list 140 with additional identifications of content servers 110 based on, inter alia, information contained in the member profile 113 of the member 101. For example, the selection component 154 can identify one or more content servers 110 that contain distributed indices 118 that are frequently searched in response to previous search queries 138 from the member 101. In another example, the selection component 154 can identify one or more content servers 110 that contain distributed indices 118 corresponding to content items 110 the member 101 frequently interacted with. In further examples, the selection component 154 can also delete, modify, or otherwise adjust the search list 140.

As shown in FIG. 2C, the content servers 118 can then perform content searches using corresponding distributed indices 111 to locate relevant content items 110 corresponding to the search query 138. Upon completing the requested content searches, the content servers 118 can provide individual sets of search results 144 to the filter component 156 of the search engine 106. The filter component 156 can then be configured to sort, filter, combine, or otherwise aggregate the received sets of search results 144 to generate overall search results 144". For instance, the filter component 156 can rank and sort the received search results 144 based on relevance, data size, data type, or other suitable criteria. The filter component 156 can then provide the overall search results 144" to the client device 102 via the input/output component 152.

Several embodiments of the computing system 100 described above can eliminate the large amount of efforts involved in maintaining a master index of all content items 110 accessible via the computer network 104 (FIG. 1). Master indices can become massive (e.g., gigabytes) when records of millions or even billions of content items are included. In contrast, the size of the records of searching features 116 can be quite small (e.g., kilobytes) because the searching features 116 do not aim to capture all references of content items 110 available on the computer network 104. Instead, the searching features 116 contain statistical or profile information related to how the content items 110 referenced in the distributed indices 111 have been searched.

The utilization of the searching features 116 instead of a master index can also allow improved scalability of the computer system 100. Unlike using master indices, modifications of references in a distributed index 111 may not affect records of searching features 116 in a one-to-one fashion. Instead, in certain embodiments, the searching features 116 capture how the references in the distributed index has been searched. Thus, a new addition to the distributed index 111 does not require an immediate update in the searching features 116. Instead, the searching features 116 may be updated when searching activities related to the new addition has been detected.

Figure 3:
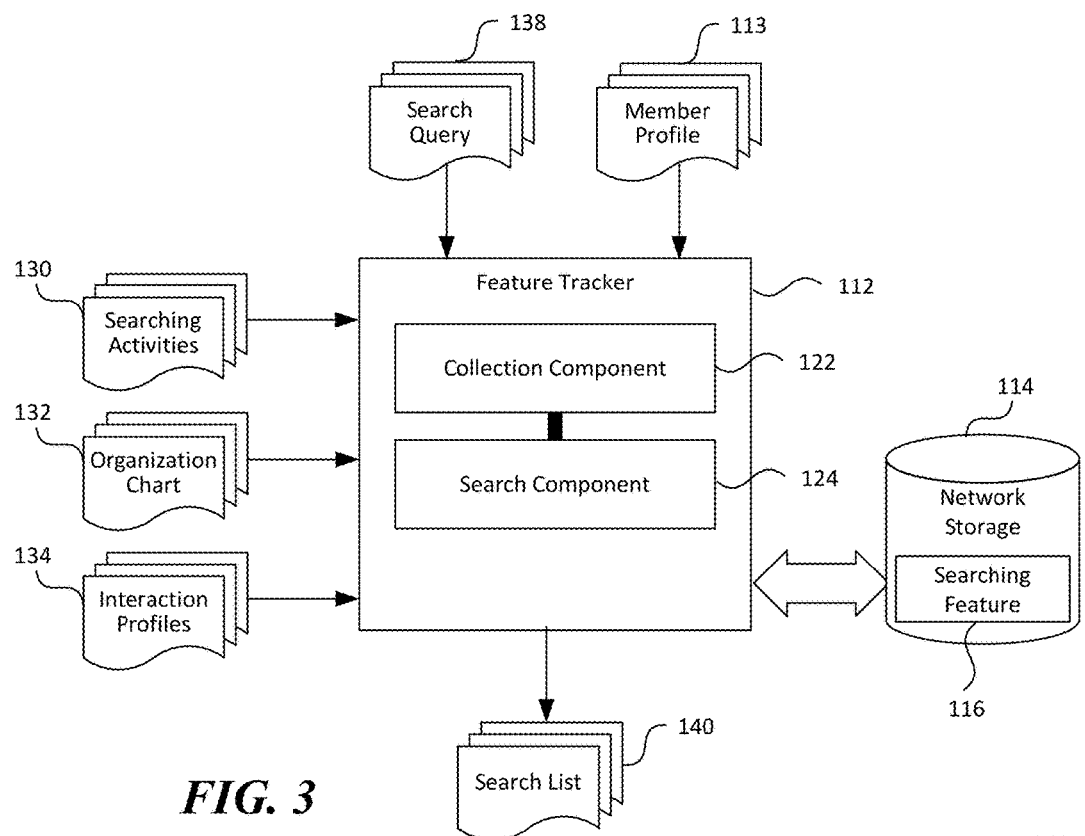
FIG. 3 is a schematic diagram illustrating hardware/software components of a feature tracker suitable for the computing system of FIG. 1 in accordance with embodiments of the disclosed technology.

FIG. 3 is a schematic diagram illustrating hardware/software components of a feature tracker 112 suitable for the computing system of FIG. 1 in accordance with embodiments of the disclosed technology. As shown in FIG. 3, the feature tracker 112 can include a collection component 122 and a search component 124 operatively coupled to one another. Though particular components are shown in FIG. 3, in other embodiments, the feature tracker 112 can also include interface components, database components, and/or other suitable components.

The collection component 122 can be configured to collect historical or statistical information related to searching activities 130 on the content servers 110. In certain embodiments, the collection component 122 can include a crawler configured to contact and collect searching histories, searching statistics, and/or other suitable information from the content servers 110 (FIG. 1) via the computer network 104 (FIG. 1). In other embodiments, the content servers 110 can be configured to provide the collection component 122 with such information on a periodic or other suitable basis. In further embodiments, the collection component 122 can periodically receive such information from the content servers and utilizing the crawler for periodic updates.

In certain embodiments, the collection component 122 can also be configured to receive organizational chart 132, interaction profiles 134, and/or other suitable information related to individual members 101 (FIG. 1). In one example, the organization chart 132 can identify one or more peer members 101 related to a particular member 101. In another example, the organization chart 132 can identify a group, department, or other suitable types of sub-organization a member 101 belongs to. In further examples, the interaction profiles 134 can include information related to searching history/frequencies, communication history/frequencies, or other suitable information related to a member 101. In other embodiments, the foregoing information related to the individual members 101 can be collected and compiled as member profiled 113 (FIG. 1) by the search engine 106.

The collection component 122 can also be configured to compile, update, or otherwise manage records of the searching features 116 based on the received searching histories, searching statistics, and/or other suitable information. For example, the collection component 122 can compile most frequently searched keywords, frequencies of searching related to the keywords, and/or other suitable information into records of searching features. In other examples, the collection component 122 can also collect interactions of the members 101 (FIG. 1) and compile such information into records of searching features related to individual members 101. Example schemas suitable for the searching features 116 are described below in more detail with reference to FIGS. 4A and 4B.

The search component 124 can be configured to determine a search list 140 of content servers 110 and/or corresponding distributed indices 118 based on the searching features 116 in response to the received search query 138 and optionally the member profile 113. For example, the search component 124 can determine that the search list 140 includes identifications of content servers 118 hosting content items 110 of a sub-organization (e.g., "engineering department") of the member 101. In other examples, the search component 124 can determine that the search list 140 can include those most searched in the organization, a sub-organization of the organization, or a group of other members the member interacts most with. Upon determining the search list 140, the search component 124 can return the search list 140 to the search engine 106 (FIG. 1).

Figure 4A:
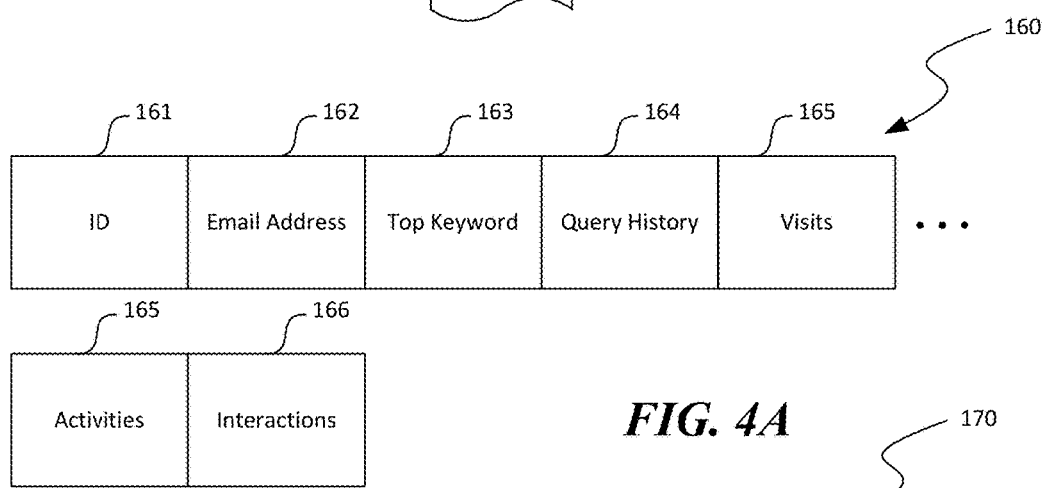
FIGS. 4A-4B are example data schemas suitable for records of searching features in accordance with embodiments of the disclosed technology.
Figure 4B:
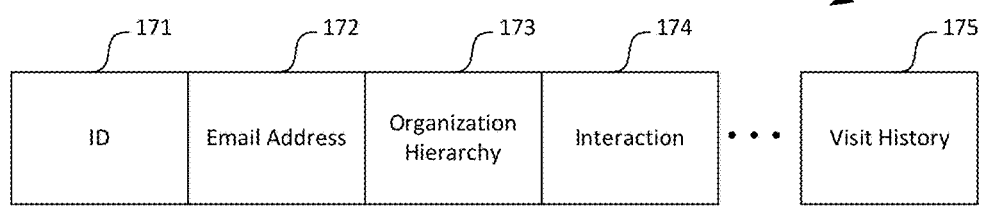

FIGS. 4A-4B are example data schemas suitable for records of searching features 116 in accordance with embodiments of the disclosed technology. As shown in FIG. 4A, a schema 160 for a record of searching features 116 can include an ID field 161, an email address field 162, a top keyword field 163, a query history field 164, a visits field 165, an activity field 165, and an interaction field 166.

The ID field 161 can be configured to contain an identification of an organization or sub-organization. The email address field 162 can be configured to contain an email address of the organization or sub-organization. The top keyword field 163 can be configured to contain top keyword(s) searched in the organization or sub-organization. The query history field 164 can be configured to contain searching history of the organization or sub-organization. The visits field 165 can be configured to contain identifications of members 101 who have visited the organization or sub-organization. The activity field 165 can be configured to contain statistics of activities (e.g., number of emails sent) in the organization or sub-organization. The interaction field 166 can be configured to contain data indicating interactions (e.g., likes) or statistics thereof in the organization or sub-organization. The following is an example record of the searching features 116 in the illustrated schema:

| | |
|---|---|
| ID | {91A08A55-A853-4A9A-8BF9-28DDF30A0FB6} |
| Email Address | group1@xyz.com |
| Top Keyword | ["Cloud", "Store", "Apps", "Updates"] |
| Query History | {"Windows 10","Redstone","Apps"} |
| Visits | {"Key":{"DateUtc":"VDate(1448928000000+0000)V"}, "Value":456} |
| Activity | [{"Key":{"DateUtc":"VDate(1448928000000+0000)V"}, "Value":75}] |
| Interactions | [{"Key":{"DateUtc":"VDate(1448928000000+0000)V"}, "Value":47}] |

FIG. 4B shows another suitable data schema 170 for the searching features 116. As shown in FIG. 4B, a record of searching features 116 can include an ID field 171, an email address field 172, an organization hierarchy field 173, an interaction field 174, and a visits field 175. The ID field 171 can be configured to contain an identification of a group of members 101 (FIG. 1) or individual members 101. The email address field 172 can be configured to contain an email address of a group of members 101 or individual members 101. The organization hierarchy field 173 can be configured to contain an organizational position of the group of members 101 or the individual members 101. The interaction field 174 can be configured to contain interaction histories of the group of members 101 or the individual members 101. The visits field 175 can be configured to contain content items 110 visited by the group of members 101 or the individual members 101. The following is an example record of the searching features 116 in the illustrated schema:

| | |
|---|---|
| ID | {91A08A55-A853-4A9A-8BF9-28DDF30A0FB6} |
| Email Address | member1@xyz.com |
| Organizational Hierarchy | [{"Key":0,"Value":1},{"Key":1,"Value":1},{"Key":2, "Value":11}] |
| Interaction | [{"Key":{"DateUtc":"VDate(1448928000000+0000)V"}, "Value":47}] |
| Visits | [{"Key":{"DateUtc":"VDate(1456790400000+0000)V"}, "Value":20}] |

Figure 5A:
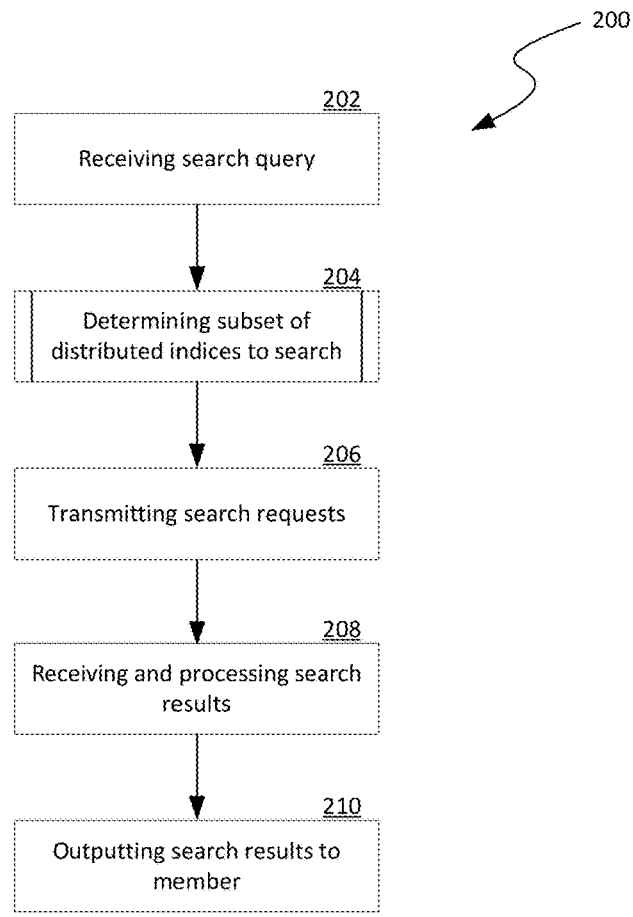
FIGS. 5A-5B are flowcharts illustrating various processes of providing distributed index searching in accordance with embodiments of the disclosed technology.

FIG. 5A is a flowchart illustrating a process 200 of providing distributed index searching in accordance with embodiments of the disclosed technology. Even though embodiments of the process 200 are described in the context of the computing system 100, in other embodiments, the process 200 can also be implemented in computing systems with additional and/or different components.

As shown in FIG. 5A, the process 200 can include receiving a search query from a member at stage 202. In certain embodiments, the search query can include one or more search terms. In other embodiments, the search query can also include an identification of the member, identification of a client device or software application used by the member, or other suitable information.

Upon receiving the search query, the process 200 can include determining a subset of distributed indices to search based on the search terms in the received search query at stage 204. In certain embodiments, the subset of distributed indices can be determined not based on a master index of the distributed indices but rather records of searching features collected from individual content servers 118 (FIG. 1). The searching features can include data or data records representing content searching or interaction profiles related to an organization or individual members of the organization. For example, the searching features can include top keywords searched, query history, amount of searching of an organization, sub-organization, groups of members, or individual members of the organization. In another example, the searching features can also include interaction history, for instance, emails sent, comments received, or other suitable types of interactions between groups of members or individual members of the organization. In certain embodiments, the foregoing determination can be performed on a server at which the search query is received. In other embodiments, the foregoing determination can be at least partially performed by a database server containing records of the searching features. The server at which the search query is received can optionally supplement, remove, or otherwise modify the determined subset of distributed indices. Examples operations of such determination are described in more detail below with reference to FIG. 5B.

The process 200 can then include transmitting search requests to content servers 118 hosting the subset of distributed indices at stage 206. In certain embodiments, the search requests can include the search terms in the received search query. In other embodiments, the search requests can also include data representing a member profile or other suitable information. The process 200 can then include receiving and processing search results at stage 208. In certain embodiments, the search results received from the content servers can be aggregated. In other embodiments, the search results can be sorted, filtered, ranked, or otherwise processed. The process 200 can then include outputting the aggregated search results to the member in response to the received search query at stage 210.

Figure 5B:
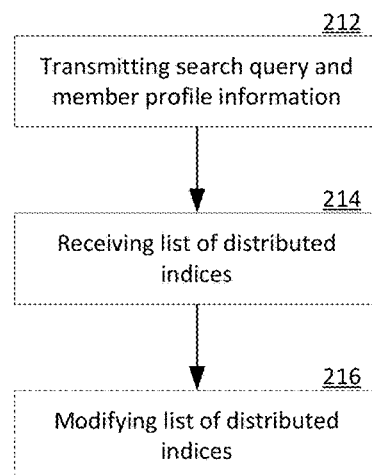

FIG. 5B is a flowchart illustrating operations suitable for determining a subset of distributed indices in accordance with embodiments of the disclosed technology. As shown in FIG. 5B, the operations can include transmitting a search query and optionally member profile information to a database server containing records of searching features collected from individual content servers 118 (FIG. 1). The operations can then include receiving a list of distributed indices to be searched from the database server at stage 214. Optionally, the operations can also include modifying the list of distributed indices by, for example, supplementing, subtracting, or otherwise adjusting items in the list of distributed indices at stage 216.

Figure 6:
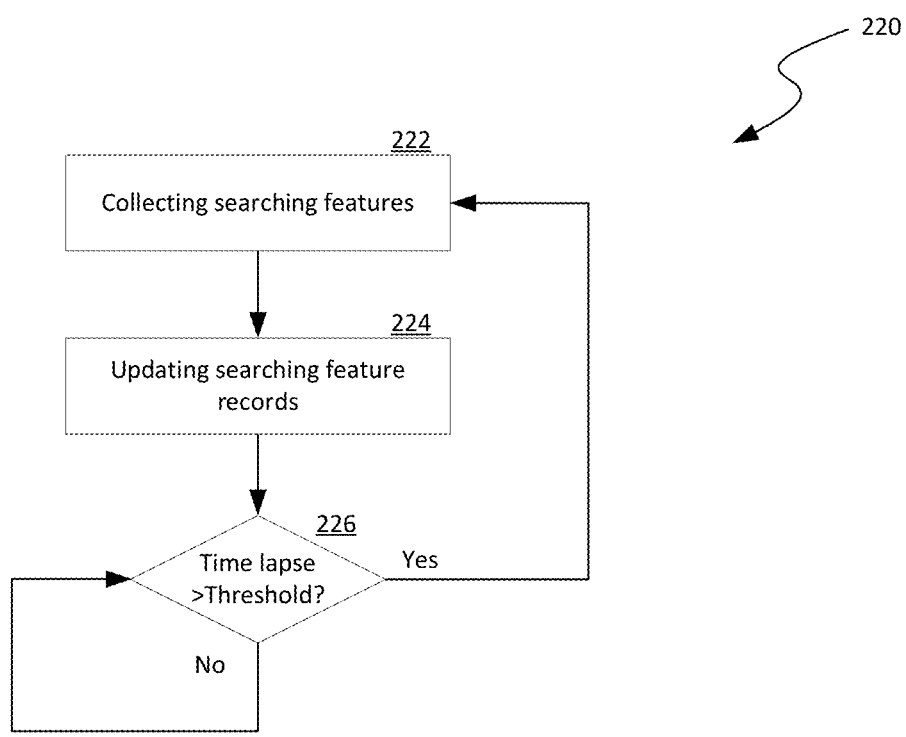
FIG. 6 is a flowchart illustrating a process of compiling a database of searching features in accordance with embodiments of the disclosed technology.

FIG. 6 is a flowchart illustrating a process 220 of compiling a database of searching features in accordance with embodiments of the disclosed technology. As shown in FIG. 6, the process 220 can include collecting searching features at stage 222. In certain embodiments, a crawler can be used to collect the searching features from the content servers 118 (FIG. 1). In other embodiments, the searching features can be collected via reporting by the content servers 118 or other suitable techniques. The process 220 can then include updating searching feature records at stage 224. In certain embodiments, entries in the searching feature records can be revised, created, deleted, or otherwise changed. In other embodiments, new searching feature records may be created. The process 220 can then include a decision stage 226 to determine whether a time lapse since last update exceeds a preset threshold (e.g., 1 day or other suitable periods). In response to determining that the time lapse since last update exceeds the preset threshold, the process 220 can revert to collecting searching features at stage 222. Otherwise, the process 220 continues to monitor for the time lapse.

Figure 7:
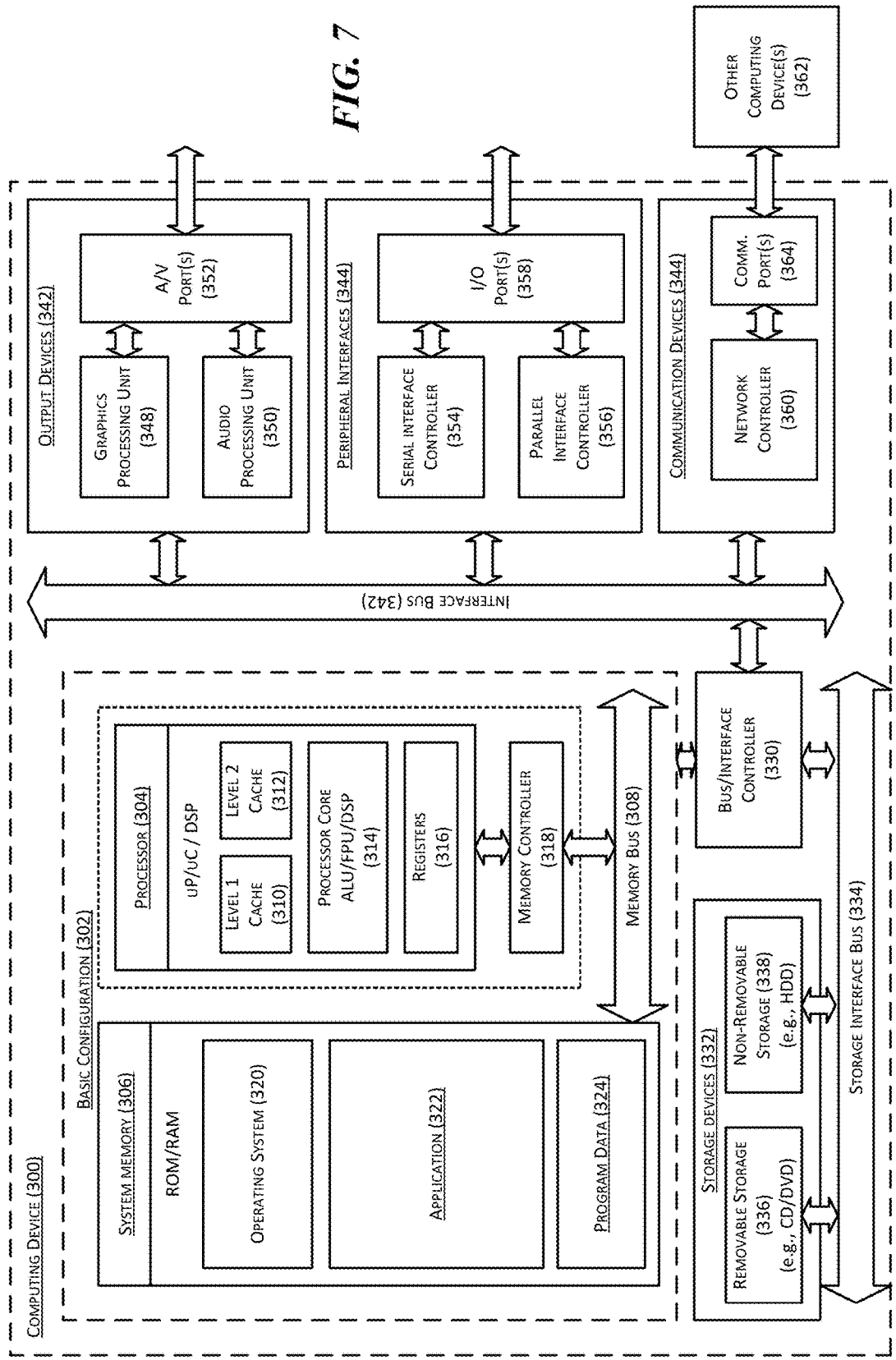
FIG. 7 is a computing device suitable for certain components of the computing system in FIG. 1.

FIG. 7 is a computing device 300 suitable for certain components of the computing system 100 in FIG. 1. For example, the computing device 300 can be suitable for the search engine 106, the feature tracker 112, or the content servers 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for providing distributed index searching in a computer system accessible to members via a computer network, the computer system including a set of content servers individually hosting corresponding content items and a distributed index of the content items, the method comprising:
    receiving, at a server, a search query for content from a member via the computer network, the search query containing search terms; and
    in response to receiving the search query, at the server, transmitting the search terms to a database server containing records of searching features related to the computer system, the records of searching features containing information of content searching profiles of an organization, a sub-organization, or the individual members of the organization, wherein the database server does not contain a master index of the distributed indices hosted on the corresponding content servers;
    receiving, from the database server, a list of distributed indices determined by the database server based on the search terms and the records of searching features;

transmitting, via the computer network, search requests to a subset of the content servers corresponding to the distributed indices in the list, the search requests requesting the content servers to search corresponding distributed indices based on the search terms; and receiving sets of search results from the subset of content servers, the search results identifying content items hosted on the corresponding content servers relevant to the search terms.

2. The method of claim 1, further comprising:

aggregating the received sets of search results from the content servers; and providing, via the computer network, the aggregated search results to the member in response to receiving the search query.

3. The method of claim 1, further comprising:

transmitting data representing a member profile of the member along with the search terms in the search query to the database server; and wherein the list of distributed indices to be searched are determined by the database server based on a combination of the search terms, the data representing the member profile, and the searching features.

4. The method of claim 1 wherein the records of the searching features contain data representing at least one of top keywords searched, a query history, statistics of activities, or interactions in the organization or the sub-organization.

5. The method of claim 1 wherein the records of the searching features contain data representing at least one of an organizational hierarchy or an interaction of the member with other members in the organization.

6. The method of claim 1, further comprising supplementing the received list of distributed indices at the server before transmitting, via the computer network, the search requests to the subset of the content servers.

7. A method for providing distributed index searching in a computer system accessible to members via a computer network, the computer system including content items hosted on content servers and a set of distributed indices of a subset of the content items hosted on a corresponding content server, the method comprising:

receiving, at the database server and via the computer network, search terms included in a search query for content from a member; and in response to receiving the search terms, at the database server, determining a subset of the distributed indices to be searched in response to the search query based on the received search terms and one or more records of searching features on the database server, the searching features containing data representing content searching profiles of at least one of an organization or the individual members of the organization, wherein the database server does not contain a master index of the distributed indices hosted on the corresponding content servers; and providing, from the database server and via the computer network, the determined list of distributed indices to a subset of the content servers corresponding to the determined subset of the distributed indices; and searching the corresponding distributed indices on the subset of the content servers based on the search terms in the search query to generate a set of search results in response to the received search query; and transmitting the generated set of search results in response to the received search query, the search results identifying content items hosted on the corresponding content servers relevant to the search terms.

8. The method of claim 7, further comprising providing, from the database server and via the computer network, a subset of the content servers corresponding to the distributed indices in the determined list in response to receiving the search terms.

9. The method of claim 7 wherein:

the searching features include data representing keywords searched in the organization; and the determined subset of indices include one or more distributed indices that have been searched based on the keywords.

10. The method of claim 7 wherein:

the searching features include data representing query history containing terms searched in the organization; and the determined subset of indices include one or more distributed indices that have been searched based on the terms in the query history.

11. The method of claim 7 wherein:

the searching features include data representing documents visited in the organization; and the determined subset of indices include one or more distributed indices that correspond to the visited documents.

12. The method of claim 7 wherein:

the searching features include data representing an organizational hierarchy of the member; and the determined subset of indices include one or more distributed indices that correspond to a sub-organization the member belongs determined based on the organizational hierarchy of the member.

13. A computing device for providing distributed index searching in a computer system accessible to members via a computer network, the computer system including a set of content servers individually hosting corresponding content items and a distributed index of the content items, the computing device comprising:

a processor; and a memory operatively coupled to the processor, the memory containing instructions executable by the processor to cause the processor to:

in response to receiving a search query for content from a member via the computer network, determine, from a database server, a list of distributed indices based on the search terms and records of searching features related to the computer system, the records of searching features containing information of content searching profiles of an organization or the individual members of the organization, wherein the database server does not contain a master index of the distributed indices hosted on the corresponding content servers;

transmit, via the computer network, search requests to a subset of the content servers corresponding to the distributed indices in the list, the search requests requesting the content servers to search corresponding distributed indices based on the search terms; and receive sets of search results from the subset of content servers, the search results identifying content items hosted on the corresponding content servers relevant to the search terms.

14. The computing device of claim 13 wherein the memory contains instructions executable to cause the processor to:

aggregate the received sets of search results from the content servers; and provide, via the computer network, the aggregated search results to the member in response to receiving the search query.

15. The computing device of claim 13 wherein the memory contains instructions executable to cause the processor to:

retrieve data representing a member profile of the member along with the search terms in the search query; and wherein the list of distributed indices to be searched are determined by the database server based on a combination of the search terms, the data representing the member profile, and the searching features.

16. The computing device of claim 13 wherein the records of the searching features contain data representing at least one of top keywords searched or a query history of the organization or the member.

17. The computing device of claim 13 wherein the records of the searching features contain data representing at least one of an organizational hierarchy or an interaction of the member with other members in the organization.

18. The computing device of claim 13 wherein the memory contains instructions executable to cause the processor to supplement the received list of distributed indices at the server before transmitting, via the computer network, the search requests to the subset of the content servers.

* * * * *